Feb. 24, 1942.　　　　E. E. WEMP　　　　2,274,174
CLUTCH MEMBER
Filed July 21, 1939　　　3 Sheets-Sheet 1
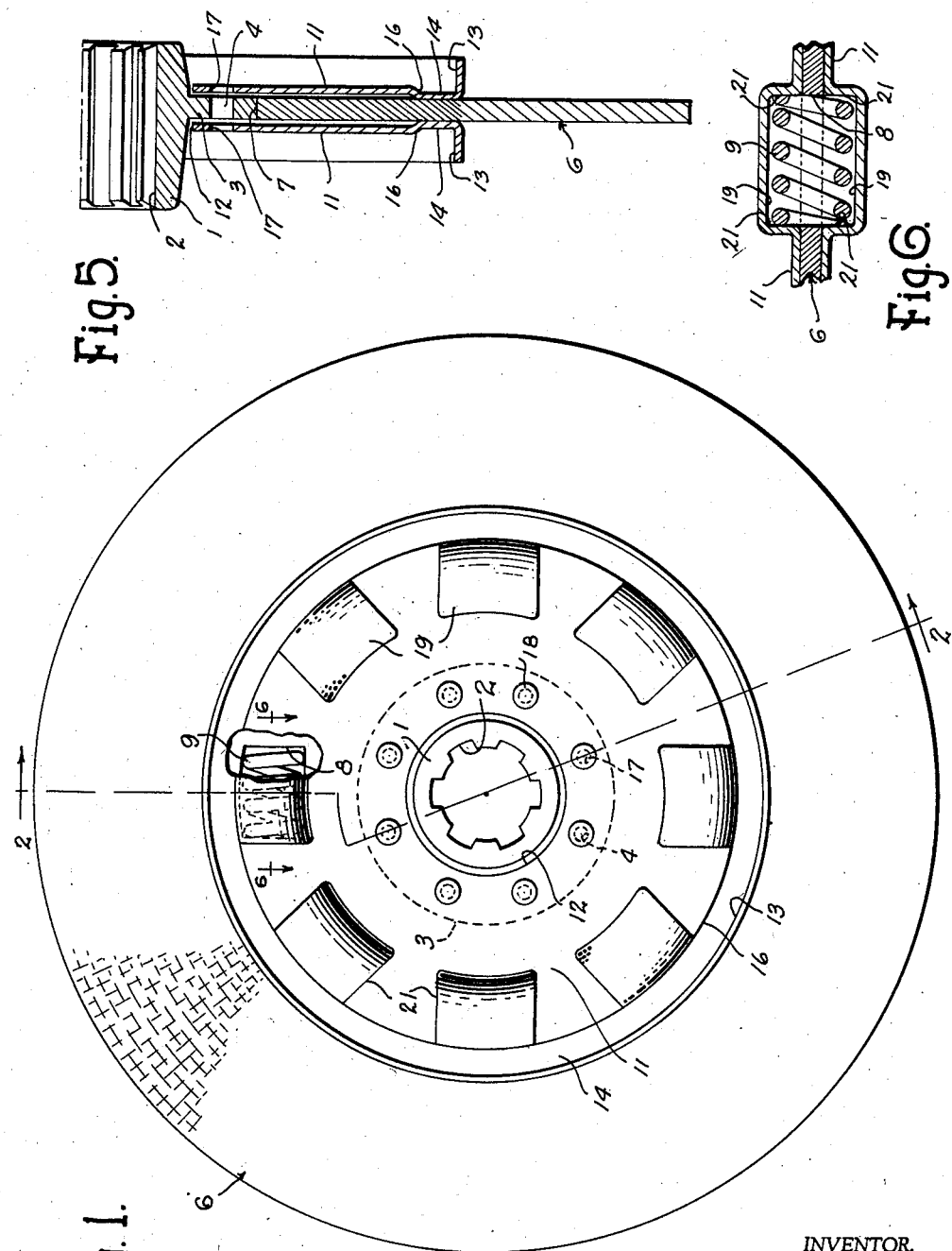
INVENTOR.
Ernest E. Wemp
BY Barnes, Kisselle, Laughlin & Raisch
ATTORNEYS Feb. 24, 1942. E. E. WEMP 2,274,174
CLUTCH MEMBER
Filed July 21, 1939 3 Sheets-Sheet 2
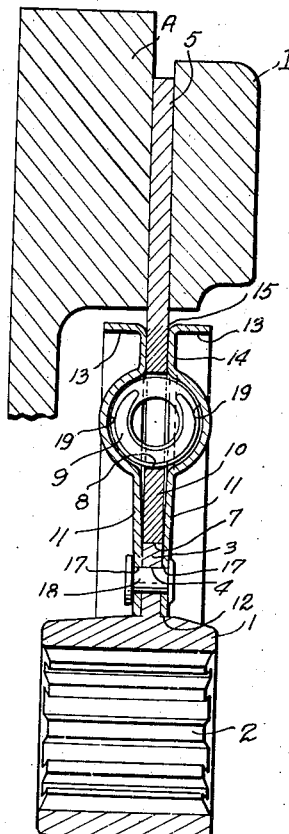
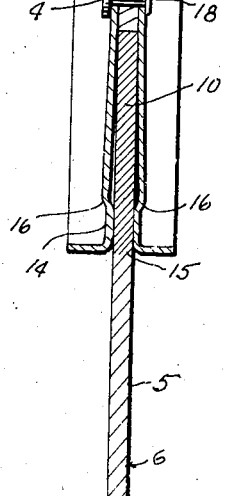
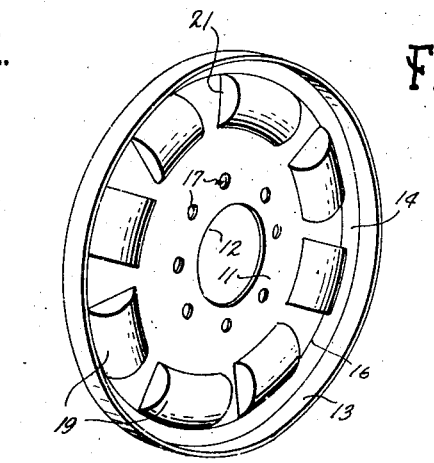
INVENTOR.
Ernest E. Wemp
BY Barnes, Kisselle, Laughlin & Keuch
ATTORNEYS Feb. 24, 1942.  E. E. WEMP  2,274,174
CLUTCH MEMBER
Filed July 21, 1939  3 Sheets-Sheet 3

INVENTOR.
Ernest E. Wemp
BY
Barnes, Kisselle, Laughlin & Raisch
ATTORNEYS

Patented Feb. 24, 1942

2,274,174

UNITED STATES PATENT OFFICE 2,274,174

CLUTCH MEMBER

Ernest E. Wemp, Detroit, Mich.

Application July 21, 1939, Serial No. 285,639

15 Claims. (Cl. 192—68)

This invention relates to a clutch member and it has to do particularly with a clutch member of the driven type. That is to say, the structure of the member is such that it ordinarily is a driven member of the clutch, although, of course, a clutch may be arranged so that the member is a driving member.

From a general standpoint, the object of the invention is the provision of an improved clutch member which is particularly adapted for use with a clutch wherein the means for providing a cushioning arrangement, which functions during clutch engagement, is incorporated in parts of the clutch structure other than in the member under consideration. In this connection, it may be stated that it has been the practice in the practical art to make clutch driven members of a yielding nature so that the member is compressed, usually against spring action, as the clutch engages. Where this cushion arrangement, however, is incorporated in other parts of the clutch structure, the member may be of a substantially incompressible nature. A clutch structure with which the member described herein may be used is shown in my application Serial No. 282,345, filed July 1, 1939.

In accordance with the invention a clutch member is provided which is constructed of a minimum number of parts and which may incorporate a vibration dampening arrangement including a yieldable torque transmitting arrangement with a friction control therefor. One form of the invention embodies a novel friction member which not only serves to provide friction faces for engaging driving members, but is arranged to transmit the torque through its body and which also furnishes friction surfaces which function in connection with the yielding action of the vibration dampener.

In another form of the invention a disc is provided to which facing material is secured. The facing material may be formed of one integral body molded or otherwise fashioned into permanent relation with the disc, or the facing may take the form of two facing elements, one on each side of the disc and secured thereto. The facing thus secured to the disc may also embody portions which serve to provide friction surfaces which function in connection with the vibration dampening action.

A clutch member thus constructed in accordance with any one of the above mentioned forms may, and preferably is, symmetrically arranged, particularly in that the coil springs of the vibration dampener which are arranged in an annulus, are centralized relative to the center line through the clutch member. The inner zone of the member which is arranged to be attached to a hub or the like comprises parts for transmitting the torque to the hub, and these parts are arranged to perform one or more additional functions, among which is that of frictionally engaging some of the surfaces of the friction member to thus establish a friction controlling action in connection with the yielding function of the dampener springs. These parts, or one of them, may also be fashioned so as to provide an oil slinger structure.

Other objects and advantages of the invention will be more readily appreciated as the detailed description progresses in conjunction with the accompanying drawings. The following description and the accompanying drawings are directed to a form of structure for carrying out the invention.

Fig. 1 is a side elevational view of a clutch member constructed in accordance with the invention, with some parts cut away.

Fig. 2 is an enlarged cross sectional view taken substantially on line 2—2 of Fig. 1.

Fig. 3 is a side elevational view on a smaller scale, showing the friction member.

Fig. 4 is a perspective view of a side plate.

Fig. 5 is a view on the order of Fig. 2 illustrating the arrangement of the hub, the friction facing, and side plates before attachment.

Fig. 6 is a sectional view taken substantially on line 6—6 of Fig. 1 but which in size compares with the illustration in Fig. 2.

Figure 7:
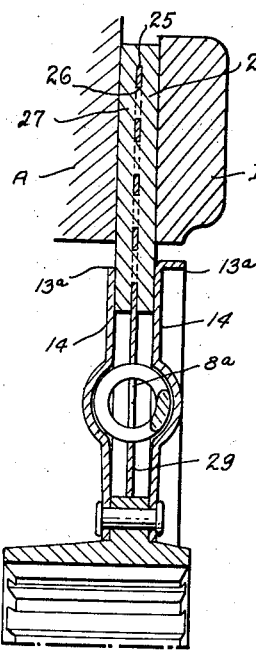
Fig. 7 is a cross sectional view illustrating a modified form of the invention.

The clutch member, as illustrated, has a hub 1 which may be splined interiorly as at 2 for a sliding connection with a shaft, usually a driven shaft. The hub has a flange 3 of relatively small radial extent and which is provided with apertures 4.

The member which herein is termed the friction member is generally shown in Fig. 3, and is of substantial radial extent. This member is generally illustrated at 6 and it has a central opening 7 arranged to fit over the flange 3 as shown in Fig. 2. It is advantageous that the friction member fit nicely over the flange, and preferably the tolerances are such that the friction member is not thicker than the flange. The friction member has a plurality of apertures or windows 8 arranged in an annular array about the central opening for accommodating the springs of a vibration dampener arrangement. A coil spring 9 is disposed in each of the apertures.

Side plates, as illustrated in Fig. 4, are provided which perform the functions of transmitting the torque, of frictionally engaging the friction member, and of holding the coil springs in assembled position. These plates may be identical except that they are mounted in reverse position. Each plate has an inner part 11 with a central aperture 12 arranged to fit over the hub, as shown in Figs. 2 and 5. The outer portion of one or both plates is provided with a flange 13 which serves to strengthen the plates and also serve as an oil slinger. Inwardly of the flange are portions 14, which, upon initial formation of the plates, may extend in a direction parallel to the hub flange 3 and friction member.

Between the portions 11 and 14 the plates are off-set as at 16 so that when the parts are initially placed together as shown in Fig. 5, the portions 11 are spaced from the hub of the flange. The inner portions 11 are provided with apertures 17 for the reception of rivets or the like 18 which are passed through the aligned apertures 4 and 17. When the rivets are tightened down the portions 11 are stressed inwardly as shown in Fig. 2 with the result that the parts 14 are caused to engage the facing with some pressure.

In that portion of each plate corresponding to the position of the coil springs, and which portion may lie just radially inwardly of the friction portions 14, the plate is formed so as to have a driving connection with the ends of the coil springs and which formation also preferably is such as to retain the coil springs in assembly. This formation preferably takes the form of recesses or pockets 19 disposed in spaced circumferential relationship and fashioned as shown in Fig. 2 to substantially follow the contour of the springs and having end walls or parts 21 for engaging the ends of the springs. In this regard the portion of the pockets which follows the contour of the spring is of rounded formation, whereas the end walls are substantially perpendicular to the plane of the member.

The manner of assembling the clutch member would seem to be quite clearly understood after a consideration of the above description as to its structure. However, it may be pointed out that the hub and friction member and plates may be located, as illustrated in Fig. 5, with the coil springs disposed in the apertures in the friction member and in the aligning pockets of the plates, and then the parts placed are secured together by the rivets 18. The rivets draw the inner portions 11 of the plates inwardly toward each other until they abut against the hub flange. This stresses the metal and causes the friction portions 14 to engage with pressure the underlying portions of the friction member.

The friction member preferably comprises a single integral body and which preferably has inner and outer zones or portions, the characteristics of which are adaptable to the use to which the zones are put. For instance, the outer zone is designed for frictional engagement with driving members. For example, the driving members may reside in the flywheel A of an engine, and a pressure plate B as shown in Figs. 2 and 7. The inner zone is arranged to transmit the torque to the dampener springs. This is depicted in Fig. 3 where the outer zone is generally illustrated at 5 and the inner zone at 10 with the line of division between the zones indicated substantially at 15. Such a clutch disc may be made in any one of various ways, as for example, by molding or by winding strip material spirally and then subjecting the same to a forming operation. Where, for example, the disc comprises a substance which is set into shape by heat and pressure, the proportion of the elements may be varied so as to give the outer zone the desired characteristics and properties for frictional engagement with driving members and to give the inner zone suitable characteristics and properties for transmitting the load to the coil springs. To this end the outer zone may have the usual characteristics of clutch friction facings, while the inner zone is preferably more rigid or hard or has a greater stiffness.

The inner and outer zones, however, may be formed at one time to provide an integral one-piece friction member so that the inner and outer zones are integrally joined, although they have these different characteristics.

In the operation of the member, when the torque is delivered from the outer zone of the friction member to the hub, the torque is delivered through the coil springs to the plates and thence to the hub. When the torque is delivered in the opposite direction, the forces are transversed through the plates to the springs and then to the friction member. Relative rocking or oscillation may occur between the friction member and the hub by compression of the coil springs, regardless of which way the torque is transmitted. This may occur incident to a heavy load or vibrations. This relative movement also takes place between the plates and the friction member, and the portions 14 of the plates frictionally engage and slide upon the friction surfaces of the friction member disposed between these portions of the plates. This furnishes a friction controlling action. Inasmuch as this friction controlling action occurs at a relatively large radius, namely, outside the annulus of the springs, the pressure does not have to be so great as it would be where the friction controlling action is on a smaller radius. The dividing line 15 between the inner and outer zones may be placed in any advantageous position, and, as shown herein, is located so that the portions 14 of the plates function on the inner zone. The dividing line may be located so that this friction controlling action takes place on surfaces like, or more in the nature of, the outer zone. As illustrated herein, the parts 14 are of continuous unbroken circumferential form, thus engaging the friction member throughout an annular area or zone, thus, in effect, dividing the friction member into three zones, namely, one for frictional engagement with the driving members, one for the frictional control of the dampener, and one for the transmission of torque to the springs. However, so far as the frictional control for the dampener is concerned, the friction member may be engaged only at spaced locations.

The oil slinger formations 13 may be formed on both of the plates as illustrated in Fig. 2. However, this structure may be used only upon one plate, as shown in Fig. 7. The oil slinger arrangement is, in most instances, needed more on the side of the driven member adjacent the pressure plate B, and in such instances where only one oil slinger is used it could be placed on the pressure plate side. However, conditions may reverse themselves so that the oil slinger structure may be used only on the flywheel side.

Figure 8:
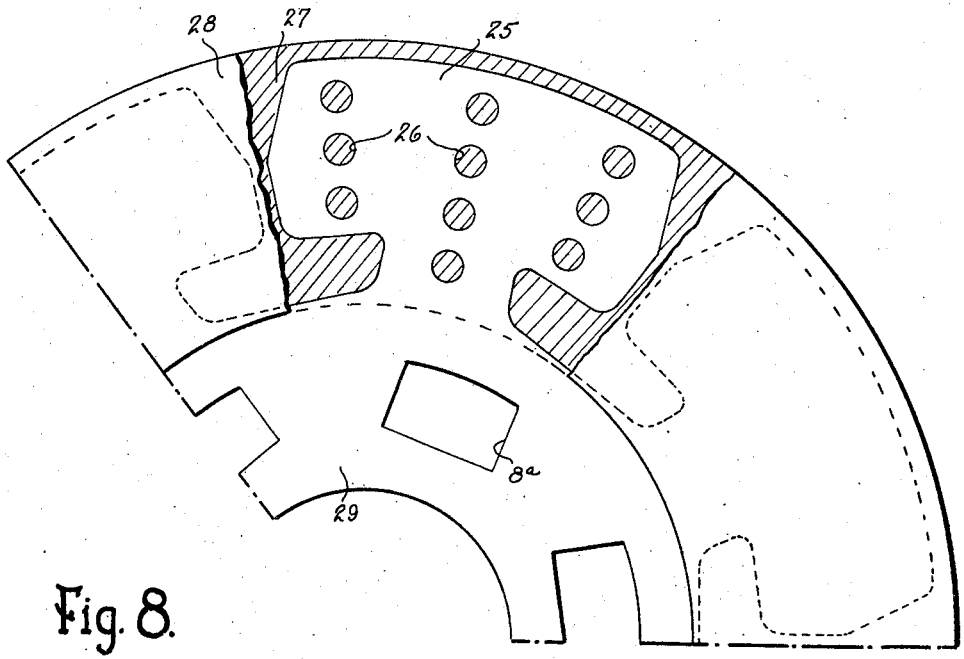
Fig. 8 is a partial plan view thereof.

In Figs. 7 and 8, the modified arrangement shown embodies a disc. This disc is shown at 25. The disc is provided with openings or apertures therein as shown at 26, and the friction material is fashioned directly to the disc. Where the friction material is molded it may be molded to provide a portion 27 on one side and a portion 28 on the other, with the material extending through the apertures. The hub structure, plate structure and spring structure embody the same arrangement as that previously described, and bear the same reference characters. The disc is provided with apertures 8a for the springs and the central portion of the disc fits over the flange of the hub, and they merely lie freely in the space inwardly of the springs as shown at 29. This form functions in the same manner as the form previously described, with the portions 14 of the plates frictionally engaging the facing so that a frictional controlling action is exerted as the springs flex. The disc itself may be of any desired structure and, as indicated in Fig. 8, its outer zone is cut away to form T-shaped spokes, thus serving to lighten the structure. This, however, is variable insofar as the invention is concerned. As illustrated in Fig. 7 the outer part 13a of the plate next adjacent the flywheel is not provided with the oil slinger.

Figure 9:
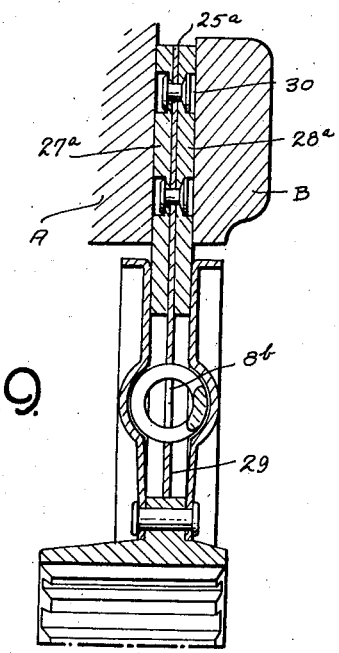
Fig. 9 is a cross sectional view similar to Fig. 7 showing a further modified form of the invention.

A still further form is shown in Fig. 9 which, however, is similar to the form shown in Figs. 7 and 8, in that it is provided with a disc 25a to which two facing elements 27a and 28a are secured as by means of rivets 30. The plate, spring and hub structure is the same as that previously described, the disc 25a, however, having apertures 8b for the springs. In this form both plates are illustrated with the oil slinger arrangement.

In some of the appended claims the friction member is referred to as a "non-metallic" member. This term is to be construed to cover a member which includes a metallic constituent embedded in the material. Also, some of the claims specify that the friction member or means has zones. This applies to all forms of the invention as the friction means shown in the modified forms has zones, but this does not mean that the zones have different properties or characteristics unless the claims specifically call for such different properties or characteristics.

I claim:

1. A clutch member comprising, a hub, friction material for engagement with clutch members and arranged to extend radially inwardly of the clutch members, means secured to the hub and overlapping and frictionally engaging substantially the radially inwardly extending part of the friction material, and means including yielding means establishing a torque-transmitting connection between the friction material and the said means secured to the hub.

2. A clutch member comprising, a hub, friction material arranged to be frictionally engaged between clutch members and arranged to extend radially inwardly of the clutch members, means secured to the hub and having a frictional engagement with the radially inwardly extending part of the friction material, and means including an annulus of coil springs for establishing a torque-transmitting connection between the friction material and the said means secured to the hub.

3. A clutch member comprising, a hub, friction material arranged to frictionally engage between clutch members and arranged to extend radially inwardly of the clutch members, a plate on each side of the friction material and secured to the hub, at least one of the plates being in frictional engagement with the radially inwardly extending part of the friction material, and an annulus of coil springs arranged to establish a yielding connection between the friction material and the plates.

4. A clutch member comprising, a hub, means including friction material adapted to be frictionally engaged between other clutch members, and the friction material being arranged to extend radially inwardly of said other clutch members, said means having a plurality of circumferentially disposed apertures, a coil spring in each aperture, a plate on each side of said means and secured to the hub, said plates having pockets for the springs, and at least one of said plates being in frictional engagement with a surface of the friction material.

5. A clutch member comprising, a hub, means including friction material adapted to be engaged between clutch members with the friction material arranged to extend radially inwardly of said clutch members, said means having a plurality of circumferentially disposed apertures positioned radially inwardly of said clutch members, a coil spring in each aperture, a pair of plates, one on each side of the first named means, said plates having formations for engaging the ends of the springs and for holding the springs in the apertures, and means for attaching the inner portions of the plates to the hub and for stressing the metal of the plates to cause the outer portion of at least one of the plates to frictionally engage the friction material.

6. A clutch member comprising, a hub with a flange, means including friction material arranged to be frictionally engaged with other clutch members with the friction material arranged to extend inwardly of said other clutch members, said means having a plurality of apertures arranged in annular array, a coil spring in each aperture, a pair of plates, one secured to each side of the flange and extending radially outwardly beyond the springs, said plates having formations for receiving and engaging the ends of the springs, the portions of the plates which are disposed radially outwardly of the springs being in frictional engagement with said friction material.

7. A clutch member comprising, a hub, a disclike member of friction material having an outer zone for frictional engagement with clutch members and an inner zone adapted to extend inwardly from said clutch members, means secured to the hub and overlapping and frictionally engaging substantially the inner zone of the member, and yielding means providing a torque-transmitting connection between said inner zone and the said means.

8. A clutch member comprising a hub, a disclike member of friction material having an outer zone adapted to be frictionally engaged with other clutch members and having an inner zone extending inwardly from the other clutch members, said inner zone having a plurality of circumferentially disposed spaced apertures, a coil spring in each aperture, a plate on each side of the friction member and secured to the hub and having means for engaging the ends of the springs, at least one of said plates being in frictional engagement with some of the surfaces of the friction member.

9. A clutch member comprising, a hub, a one piece disc-like friction member of friction material characterized in that it has an outer zone with properties adapted for frictional engagement with other clutch members and an inner zone arranged to extend radially inwardly of the other clutch members and characterized in that it has strong or rigid properties, means secured to the hub and overlapping a portion of the inner zone and having a frictional engagement therewith and yielding means providing a torque-transmitting connection between said inner zone and said means and affording relative movement therebetween, said frictional engagement serving to dampen the relative movement between the friction member and said means secured to the hub.

10. A clutch member comprising, a hub, a one piece disc-like friction member of friction material characterized in that it has an outer zone with properties adapted for frictional engagement with other clutch members and an inner zone arranged to extend radially inwardly of the other clutch members and characterized in that it has strong or rigid properties, said inner zone having a plurality of apertures therein, a spring in each aperture, a pair of plates secured to the hub and arranged to confine the springs and having a driving relationship with the springs and extending radially outwardly of the springs and frictionally engaging the friction member.

11. A clutch driven member comprising, a disc, friction material secured to the disc and arranged to be engaged between other clutch members and to extend radially inwardly from said other clutch members, a plurality of circumferentially arranged apertures in the disc, a coil spring in each aperture, a plate on each side of the disc and secured to the hub and having a driving relationship with the springs, said plates having a frictional engagement with the friction material.

12. A clutch member comprising, a disc having openings therethrough, friction material on the disc having parts lying in the openings which serve to secure the disc and friction material together, said friction material arranged to be engaged between clutch driving members and to extend radially inwardly therefrom, said disc having circumferentially arranged apertures therein, a coil spring in each aperture, a hub, a plate on each side of the disc and secured to the hub and each having a driving relationship with the springs and a frictional engagement with the friction material.

13. A clutch comprising, a disc, facing material secured to the outer zone thereof for engagement between clutch members and arranged to extend radially inwardly from the clutch members, said disc having a plurality of circumferentially arranged apertures disposed radially inwardly from the facing material, a spring in each aperture, a hub, a plate on each side of the disc and secured to the hub, said plates having formations for engaging the ends of the springs and for holding the springs in the apertures, said plates having a frictional engagement with the radially inwardly extending part of the friction material.

14. A clutch member comprising, a hub, friction means including friction material for engagement with clutch members, the friction material being arranged to extend radially inwardly from said clutch members, means connected to the hub, said means extending radially outwardly from the hub in overlapping relationship with and in surface to surface frictional engagement with the inwardly extending portion of the friction material, and means establishing a yieldable torque transmitting connection between the said friction means and the said means connected to the hub.

15. A clutch member comprising, a hub, friction means including friction material for engagement with clutch members, the friction material being arranged to extend radially inwardly from said clutch members, means extending along side of the friction means and having its radially inward part connected to the hub and having its radially outward part in overlapping relation with and in surface to surface frictional engagement with the inwardly extending part of the friction material, and means disposed on a radius between the radially inward and radially outward parts of the said means connected to the hub for establishing a yieldable torque transmitting connection between the friction means and the said means connected to the hub.

ERNEST E. WEMP.